United States Patent
Banda et al.

(10) Patent No.: US 8,224,851 B2
(45) Date of Patent: Jul. 17, 2012

(54) TAG CREATION SYSTEM

(75) Inventors: Ravi Banda, Fremont, CA (US); Nancy Valerie Lang, Palatine, IL (US); Gopi Jaggavarapu, Fremont, CA (US); Guga Prian Ganesan, Pradesh (IN); Kathi Lynn Chenoweth, Schereville, IN (US)

(73) Assignee: Oracle International Corporation, Redwood Shores, CA (US)

( * ) Notice: Subject to any disclaimer, the term of this patent is extended or adjusted under 35 U.S.C. 154(b) by 358 days.

(21) Appl. No.: 12/510,517

(22) Filed: Jul. 28, 2009

(65) Prior Publication Data

US 2011/0029567 A1   Feb. 3, 2011

(51) Int. Cl.
*G06F 17/30* (2006.01)

(52) U.S. Cl. ........ 707/781; 707/783; 707/785; 715/741; 715/743

(58) Field of Classification Search .......... 707/781–788; 709/229; 715/741, 743
See application file for complete search history.

(56) References Cited

U.S. PATENT DOCUMENTS

| | | | |
|---|---|---|---|
| 6,681,223 B1 | 1/2004 | Sundaresan | |
| 2002/0111843 A1 | 8/2002 | Wellenstein | |
| 2007/0106892 A1* | 5/2007 | Engberg | 713/168 |
| 2007/0185891 A1* | 8/2007 | Durvasula | 707/101 |
| 2007/0194882 A1* | 8/2007 | Yokota et al. | 340/5.61 |
| 2007/0290815 A1* | 12/2007 | Delis | 340/10.41 |
| 2007/0294240 A1 | 12/2007 | Steele et al. | |
| 2008/0010615 A1* | 1/2008 | Curtis et al. | 715/846 |
| 2008/0016054 A1 | 1/2008 | Liska | |
| 2008/0016098 A1 | 1/2008 | Frieden et al. | |
| 2008/0065995 A1* | 3/2008 | Bell et al. | 715/751 |
| 2008/0071929 A1* | 3/2008 | Motte et al. | 709/246 |
| 2008/0086496 A1* | 4/2008 | Kumar et al. | 707/102 |
| 2008/0282198 A1* | 11/2008 | Brooks et al. | 715/854 |
| 2009/0106307 A1* | 4/2009 | Spivack | 707/103 R |
| 2009/0157618 A1* | 6/2009 | Matheny | 707/3 |
| 2009/0216867 A1* | 8/2009 | Pusateri et al. | 709/222 |
| 2009/0265631 A1* | 10/2009 | Sigurbjornsson et al. | 715/716 |
| 2009/0287989 A1* | 11/2009 | Chakra et al. | 715/205 |
| 2009/0299725 A1* | 12/2009 | Grigsby et al. | 704/2 |
| 2009/0328186 A1* | 12/2009 | Pollutro et al. | 726/13 |
| 2010/0005312 A1* | 1/2010 | Rom et al. | 713/182 |
| 2010/0030552 A1* | 2/2010 | Chen et al. | 704/9 |
| 2010/0036856 A1* | 2/2010 | Portilla | 707/100 |
| 2010/0180218 A1* | 7/2010 | Boston et al. | 715/759 |

OTHER PUBLICATIONS http:///www.salesjobsinireland.com/job-tags; © http://www.salesjobsinireland.com; p. 1, Jul. 28, 2009.
http://swik.net/job?tagCloud; © 2009 DZone, Inc.; p. 1.
http://www.workcircle.com; Copyright Workcircle Ltd © 2008; pp. 1-2.

(Continued)

*Primary Examiner* — Hahn Thai
(74) *Attorney, Agent, or Firm* — Squire Sanders (US) LLP (57) ABSTRACT

A system to create tags for tag cloud displays includes an authentication service to authenticate a user. The system includes a set of valid resources stored in a database system. A tag creation tool permits the authenticated user to create at least one tag that serves to identify a selected resource within the set of valid resources. Each tag includes a weighted value. Each tag may include a public attribute that indicates that the tag is accessible to authenticated users and non-authenticated users. Alternatively, each tag may include a private attribute that indicates that the tag is only accessible to the authenticated user. A user interface displays tags in a tag cloud in accordance with attributes of the tags and weighted values of the tags.

15 Claims, 9 Drawing Sheets

OTHER PUBLICATIONS http://www.cyberspacejobs.com; Copyright © 2009 Cyberspace Limited; pp. 1-3.

http://www.devseeker.In/tag/; © 2007 devseeker.in; p. 1.

http://www.vfreshers.com/tag/freshers-jobs-in-delhincr/; Freshers Jobs in India, Entry Level Careers © 2007-2009; Powered by WordPress; Design by Jauhari Media; pp. 1-7.

http://www.jobster.com/; Copyright © 2004-2009 Recruiting.com, Inc.; pp. 1-2.

http://www.monsterindia.com/index.html; © 2008 Monster; p. 1.

http://www.look4jobs.info/; © Copyrights 2006 Look 4 Jobs; Web Services by Yahoo!; pp. 1-2.

* cited by examiner

TAG CREATION SYSTEM

FIELD OF THE INVENTION

One embodiment is directed generally to a computer system, and in particular to a system for configuring a tag cloud.

BACKGROUND INFORMATION

A keyword search is often used to locate an item of information. To perform a keyword search, a user typically inputs at least one term that is relevant to the information to be retrieved. Upon receiving the user's input, a search engine typically examines its database or keyword index, and provides a result set that includes a listing of the best-matching items of information, if any, based on the user's input.

Generally, keyword searches may be found in a number of applications. For example, some companies may provide a keyword search tool on their employment sites to allow candidates to search for job requisitions. A job requisition typically includes various information about a job. This information may include the organization, position, salary range, work preferences, travel preferences, required skills, desired skills, and educational qualifications. To locate a job requisition, the user is responsible for coming up with the search terms that will serve as the basis for locating relevant job requisitions. However, an information retrieval system that relies primarily on the user to generate the necessary input to locate an item of information may experience a number of drawbacks.

For example, when performing a keyword search, there is a possibility that a user may enter input that does not provide any hits within the database or keyword index. In these instances, a user's input will not be able to locate any relevant job requisitions. In some cases, there may be a job requisition that is relevant to the user's search objectives, but is not located due to the user's input. For example, the user's input may include a misspelling, or may utilize different terms, describing the same topic, than that found in the job requisition, database, or keyword index.

In addition, when performing a keyword search, there is a possibility that a user may input search terms that result in an excessive amount of hits. The result itself may take a significant amount of time to load. Some of the hits may contain the search term, but the context or overall subject matter of the job requisition may not be particularly relevant to the type of information that the user is seeking. When an excessive amount of hits is obtained, the user may have to spend a significant amount of time sorting through the results or may need to refine his/her search.

This type of information retrieval, which relies primarily on a user generating the input, does not indicate the type of results that a user may expect to receive prior to producing the results. In addition, this type of information may include job requisitions that are no longer valid, and produce error messages when selected.

Furthermore, to relocate an item of information, there may be instances in which a user may have to reenter or recreate the search criteria that were previously entered into the keyword search, and search through the results.

SUMMARY

One embodiment is a system to create tags for tag cloud displays. The system includes an authentication service to authenticate a user. The system includes a set of valid resources stored in a database system. A tag creation tool permits the authenticated user to create at least one tag that serves to identify a selected resource within the set of valid resources. Each tag includes a weighted value. Each tag may include a public attribute that indicates that the tag is accessible to authenticated users and non-authenticated users. Alternatively, each tag may include a private attribute that indicates that the tag is only accessible to the authenticated user or to the creator of the tag. A user interface displays tags in a tag cloud in accordance with attributes of the tags and weighted values of the tags.

DETAILED DESCRIPTION

One embodiment is an information retrieval system in which resources of information are accessible by tags, which are enabled to be displayed in tag clouds. A tag creation tool permits the authenticated user to create at least one tag that serves to identify a selected resource within the set of valid resources. Each unique tag includes a weighted value that can be assigned by the system or a user. Each tag may include a public attribute that indicates that the tag is accessible to authenticated users and non-authenticated users. Alternatively, each tag may include a private attribute that indicates that the tag is only accessible to the authenticated user. A user interface displays a set of unique tags in a tag cloud in accordance with attributes of the tags and weighted values of the tags.

Figure 1:
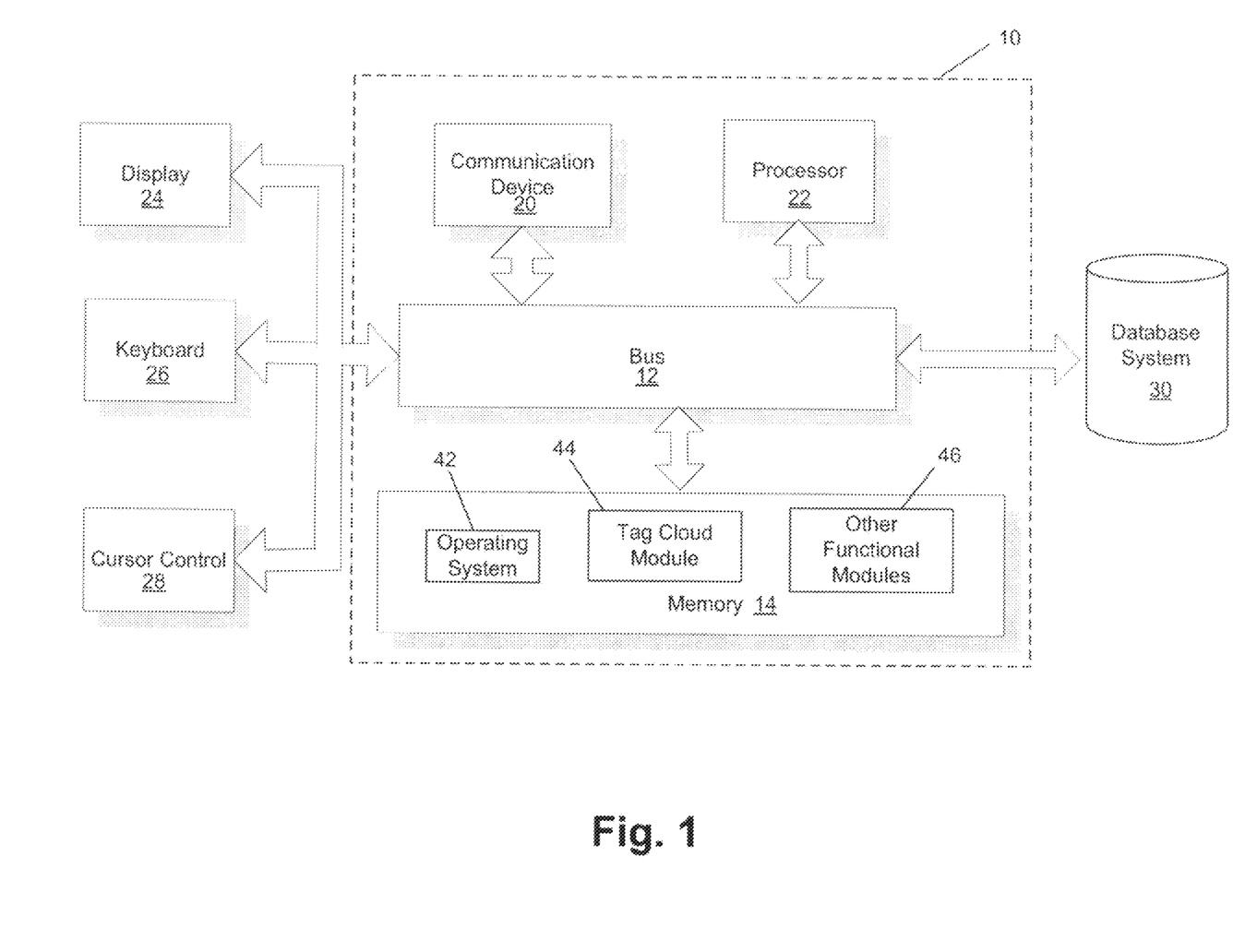
FIG. 1 is a block diagram of a system that is configured to implement one embodiment of the present invention.

FIG. 1 is a block diagram of a system 10 that can implement one embodiment. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. Modules include an operating system 42 that provides operating system functionality for system 10. Modules further include a tag cloud module 44, which configures a tag cloud based on a number of determinations, as disclosed in more detail below. Modules may include other functional modules 46. For example, functional modules 46 may include a software module that may utilize information retrieval techniques, such as Oracle Fusion Recruiting. In other embodiments, tag cloud module 44 may be a stand-alone system, or may be part of any other system.

Database system 30 may include a database server and any type of database, such as a relational or flat file database. Database system 30 may store data (e.g., resources) related to tag cloud module 44 and/or any data associated with the system 10 or its associated modules.

Figure 2:
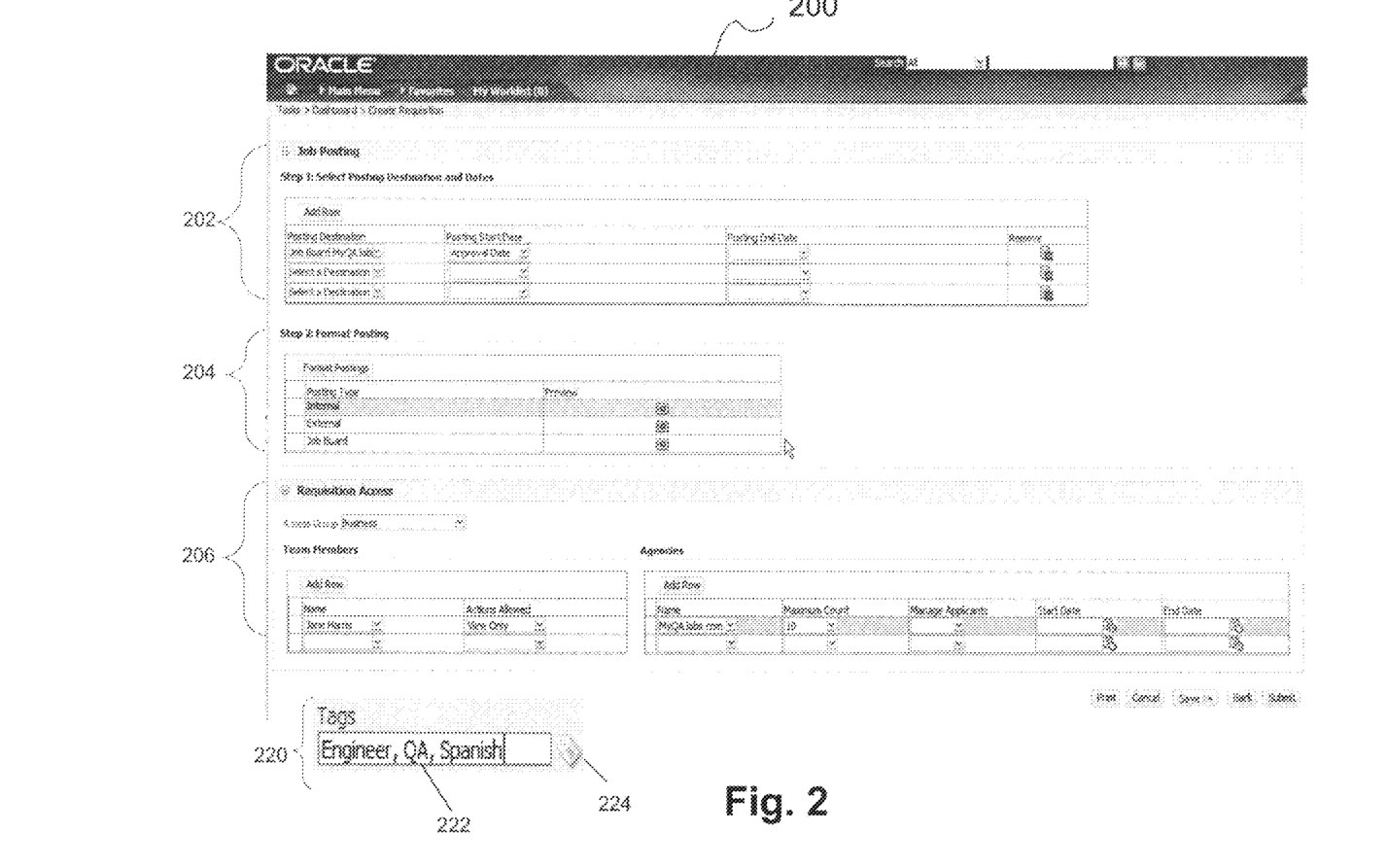
FIG. 2 is an illustration of a user interface for creating tags in accordance with one embodiment.

FIG. 2 illustrates a user interface for a job recruitment application program according to one embodiment. The job recruitment application program allows an authorized user to create a requisition for a particular job. An authorized user may be an entity that is responsible for handling a particular job posting or requisition, such as a hiring manager or a recruiter. To create a requisition, the authorized user enters all applicable information into user interface 200.

User interface 200 includes a number of fields in which an authorized user may enter data pertaining to the job requisition. Examples of data that an authorized user may enter to create a job requisition may include information relating to the location and dates of the posting 202, information relating to the format of the posting 204, and information relating to the accessibility of the posting 206. FIG. 2 illustrates an exemplary subset of data that may be entered for a job posting.

User interface 200 includes a tag creation tool 220. Tag creation tool 220 provides the authorized user with the ability to create tags for a requisition, which has been created via user interface 200. In general, a tag is a label that serves to identify data stored in memory. In this context, a tag may serve to identify a resource, such as a job requisition, which may be stored in database system 30. Tag creation tool 220 includes a tag creation field 222 and a tag submission icon 224. When an authorized user wants to create a tag, the authorized user enters a tag into tag creation field 222. In this example, the authorized user has entered three tags for the requisition, shown in FIG. 2. The first tag is "Engineer." The second tag is "QA." The third tag is "Spanish."

A tag may include any number of characters and/or words. Tag creation tool 220 allows the authorized user to enter substantially any input to represent a tag. Generally, keywords of a resource (e.g., job requisition) are selected as tags. Words that may further market the resource may be selected to serve as a tag. FIG. 2 illustrates a tag creation tool 220 in which no restrictions are placed as to what may or may not serve as a tag. In other embodiments, certain restrictions may be placed as to what may qualify or not qualify as a tag. For example, these restrictions may include the number of words that may collectively serve as a tag, or the use of inappropriate language.

Tags may be keywords that summarize the subject matter and general content of a job requisition. For example, FIG. 2 illustrates an instance in which an authorized user has entered tags in which each tag is characterized as a single word (e.g., an "Engineer" tag and a "Spanish" tag) or as a single acronym (e.g., "QA" tag). It is further recognized that the authorized user may create a tag entry, such as "Software Testing." The job requisition associated with user interface 200 is related to an engineering position involving Quality Assurance (QA). Additionally, this job may require or desire a person, who is fluent in Spanish. By selecting at least one of the tags (Engineer, Spanish, and/or QA), an authorized user (e.g., a candidate) is able to quickly locate and apply to this job requisition.

To be able to differentiate between different tag entries, tag creation tool 220 may provide a specific manner in which an authorized user may indicate each tag entry that is to be displayed, independently. For example, in FIG. 2, the authorized user enters a comma to separate different tag entries. Other tag entry separators may be used in tag creation tool 220 to indicate one tag entry from another tag entry.

In one embodiment, the authorized user enters all necessary job requisition information into applicable job requisition fields 202, 204, and 206 of user interface 200. Once data has been entered for the requisition, tag creation tool 220 may be displayed so that the authorized user may create tags for the job requisition. Additionally or alternatively, the authorized user may select or access tag creation tool 220 from one of the user interfaces of tag cloud module 44. The authorized user inputs tags to be associated with the job requisition. Once tags have been entered, the authorized user may submit the tags by activating the tag submission icon 224. After submitting the tags, the authorized user may make modifications to his tag entries for the given requisition.

Figure 3:
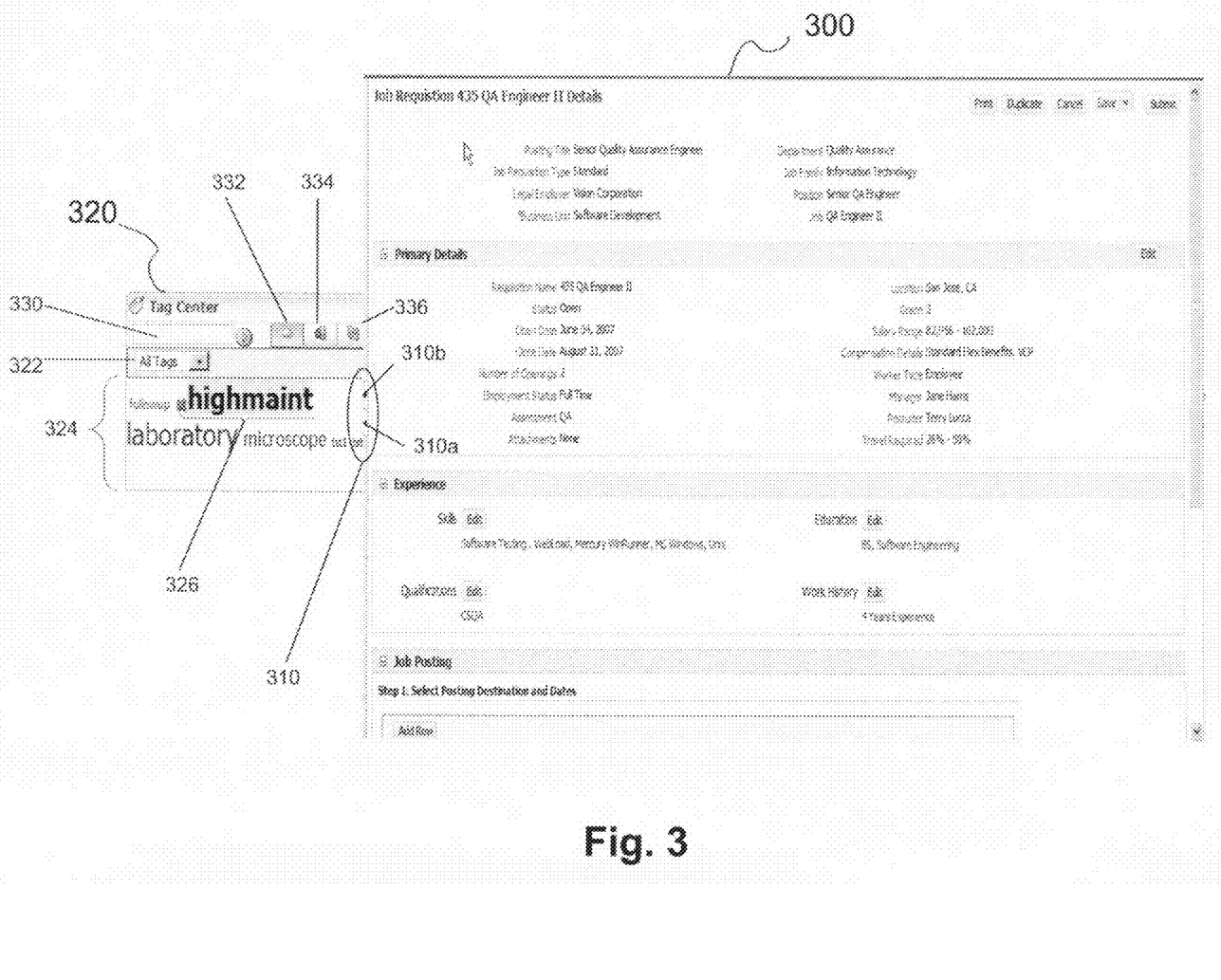
FIG. 3 is an illustration of a user interface for an authorized entity of the selected resource to create and/or modify tags in accordance with one embodiment.

FIG. 3 illustrates a user interface that provides an opportunity for an authorized user to create, modify, or delete a tag within a tag set of a selected requisition in accordance with one embodiment.

User interface 300 displays a selected job requisition as it appears in a posting or as it may appear in a posting when information pertaining to the job requisition has been submitted. When an authorized user is permitted to access and modify any tags associated with the job requisition, then tag cloud module 44 is configured to provide the authorized user with tag center 320. In FIG. 3, tag center 320 may be displayed upon activating button 310a, and may be hidden from view upon activating button 310b. In alternative embodiments, tag center 320 may be obtained by employing other software mechanisms.

Tag center 320 allows an authorized user to create, modify, or delete any tags, which may be contained in a tag set associated with a resource. A user may select or highlight 326 an existing tag to be able to modify or delete the tag.

Tag center 320 includes a filter 322 and a corresponding tag section 324. Filter 322 allows an authorized user to obtain tags of a selected attribute. Once the tags have been filtered according to the filter setting, tag center 320 displays the resulting tag set in corresponding tag section 324.

In FIG. 3, filter 322 includes a number of filter settings. For example, a tag set associated with a selected requisition may include an "All Tags" setting such that the resulting tag set displays all of the tags associated with the requisition. Filter 322 may include a "My Tags" setting such that the resulting tag set displays all tags of the selected requisition that are associated with the current authorized user.

Tag center 320 includes a number of viewing options. Option 332, when selected, displays the filtered tag selection in a tag cloud format in the corresponding tag section 324, as shown in FIG. 3. Option 334, when selected, displays the filtered tag selection in a list format within tag section 324. Option 336, when selected, refreshes tag section 324 in the event any changes were made to the tags within tag section 324.

Figure 4:
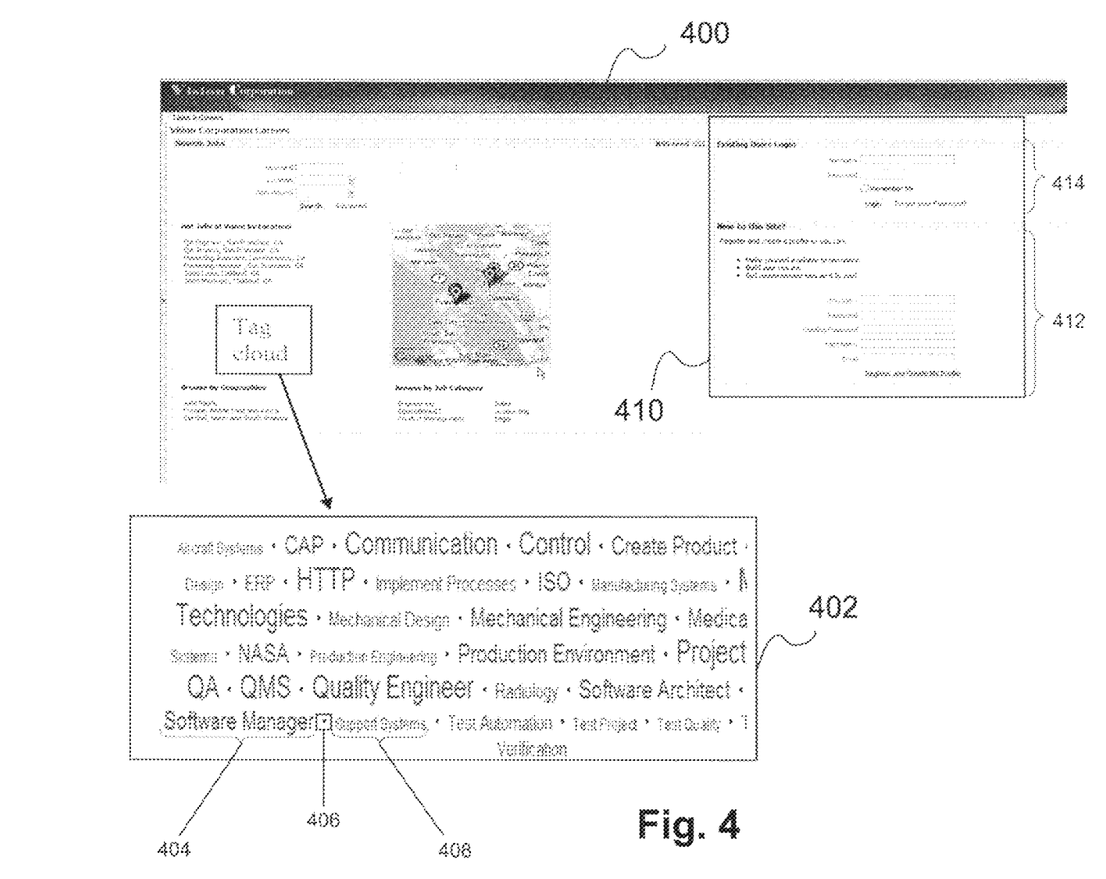
FIG. 4 is an illustration of a tag cloud display in accordance with one embodiment.

FIG. 4 illustrates one implementation of a tag cloud display, as applied to a job requisition application program in accordance with one embodiment. As illustrated in FIG. 4, job requisition application program includes a user interface 400. User interface 400 includes a tag cloud display 402. Tag cloud display 402 includes a number of tags, which are separated by a tag separator 406. Tag separator 406 assists in identifying where one tag ends and another tag begins or vice versa.

A tag identifies a resource. A tag may be any type of identifier that serves to assist a user in locating a corresponding resource. A tag may be any number or combination of characters, words, or images, as defined by the tag creator. For example, a tag may be a single word (e.g., Radiology), a combination of words (e.g., Software Manager) or an acronym (e.g., HTTP), as shown in FIG. 4. Each tag within tag cloud display 402 is arranged in a manner that allows a user to locate a particular tag with relative ease. For example, FIG. 4 shows a tag cloud display in which the tags are arranged in alphabetical order.

A resource may have a number of unique tags associated with it. A resource typically refers to anything that has an identity. For example, a resource may include a data record, a file, a webpage, a document, a data object, an image, an audio clip, or a combination of resources. In the implementation shown in FIG. 4, each tag identifies information pertaining to a job requisition.

Tag cloud display 402 is configured to display tags based on their respective attributes and/or weighted values. For example, each unique tag may be displayed in accordance with its weighted value. The weighted value indicates a magnitude by which a particular tag should be emphasized in tag cloud display 402. Each tag has a weighted value that depends on a predetermined number of factors. In FIG. 4, each tag has a weighted value that includes a frequency of that particular tag with respect to a particular set of resources. For example, "Software Manager" tag 404 has a greater weighted value than "Support Systems" tag 408. This indicates that the "Software Manager" tag 404 refers to a greater number of resources than the "Support Systems" tag 408. In other words, there may be more job requisitions that relate to a "Software Manager" than to "Support Systems."

FIG. 4 illustrates a tag cloud 402 for all tags, which include at least a "public" attribute. In addition, tag cloud display 402 only displays tags which are valid in one embodiment. A tag is considered to be valid if the resource assigned to the tag is valid. In FIG. 4, a job requisition serves as a resource. A job requisition is deemed valid if the job requisition is public (e.g., published on the site), and if the job position is still open to candidates. If a tag is not assigned to a resource, or if the resource is deemed to be invalid at anytime, then the tag is not displayed in tag cloud 402. For example, a resource of FIG. 4 may be deemed invalid when the job requisition has not been published on the site, has expired, or has been closed.

Selecting a tag from tag cloud display 402 results in a display of the resources that are associated with the selected tag. If there is only a single resource associated with the tag, then the resource (e.g., job requisition) itself will be displayed. If there is more than one resource associated with the tag, then a user interface with a link to each of the resources will be displayed. Upon activating or selecting a link, the resource (itself) will be displayed.

User interface 400 includes a user authentication service 410. User authentication service 410 includes a user registration service 412 and a user login service 414. User registration service 412 allows a user, if permitted by the system, to create an account with the site to become an authorized user. To register with the site, user registration service 412 may require a user to input a number of required fields, such as a username, a password, a password confirmation, a last name, and an e-mail address. User login service 414 allows a user, already registered with the site, to access his/her account by inputting a number of required data fields, such as a user name and password. Examples of users that may be authorized to create an account may include a hiring manager, a recruiter, or a jobseeker.

Figure 5:
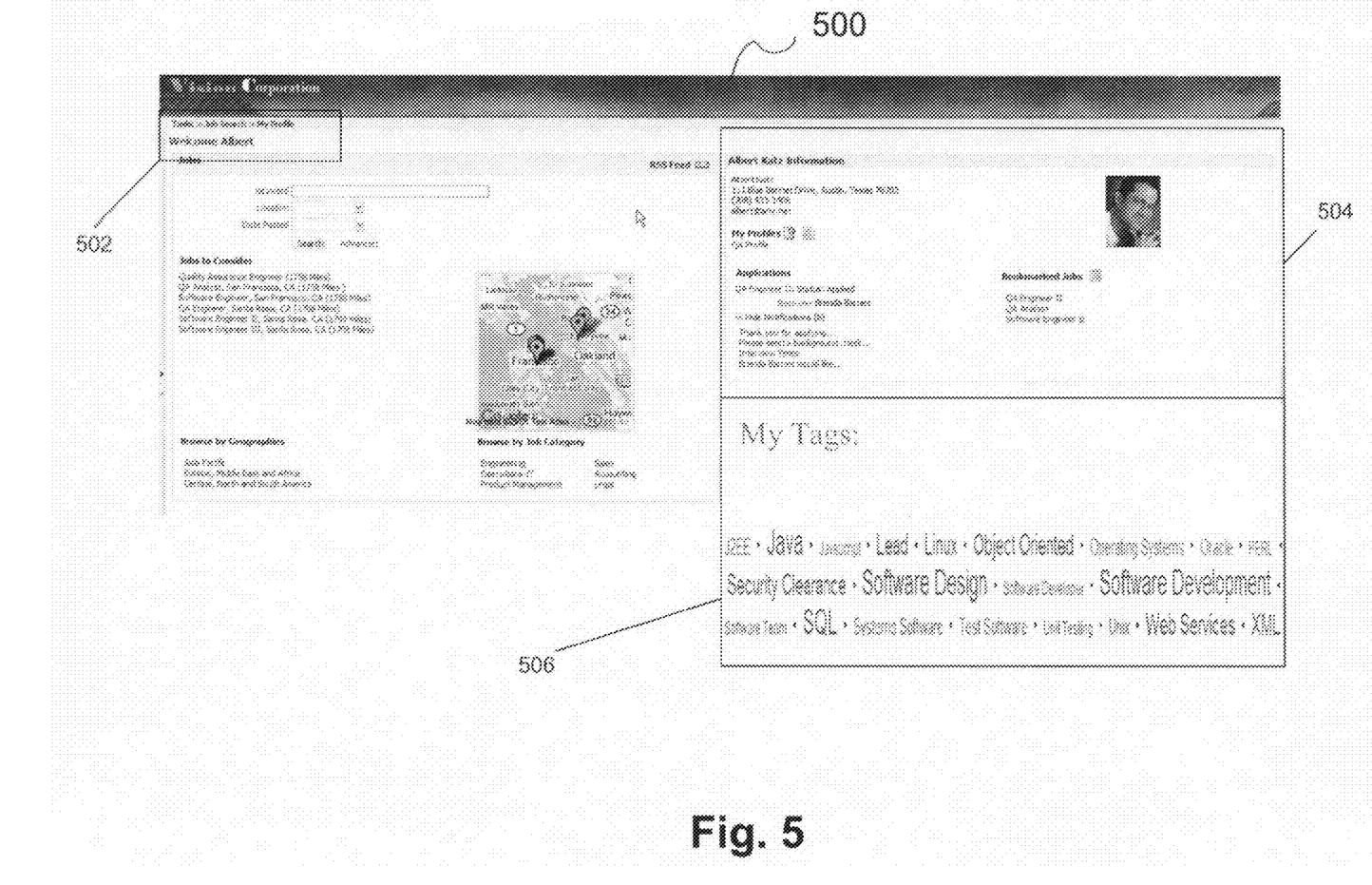
FIG. 5 is an illustration of a tag cloud display in accordance with one embodiment.

FIG. 5 illustrates a user interface that is displayed when a user logs onto the site and is authenticated in accordance with one embodiment. User interface 500 provides the user with access to his/her account 502 when the user is authenticated. User interface 500 allows a user to create a profile 504. Profile 504 may include personal information about the user, as well as any additional information that is relevant to the user and his/her profile for the company. For example, if the user is a jobseeker, then profile 504 may include personal information, resume information, and job requisition information.

User interface 500 includes a "My Tags" section. "My Tags" section includes a tag cloud 506, which includes a number of tags, which are associated with the user of the account 502. Each tag within tag cloud 506 is a tag that has been created, modified, or selected by the authorized user of the account 502. A tag can be selected by a user in response to a suggestion by the tag creation system.

In one implementation, tag cloud 506 includes tags that have a "private" attribute setting. The private attribute is an attribute that identifies the authenticated user of the account. Similar to the tags of public tag cloud display 402 of FIG. 4, each tag of private tag cloud 506 may include a number of characters, words, and/or images. In addition, each tag of tag cloud 506 may include a weighted value that is used to determine the magnitude of emphasis (e.g., size, color, boldness) that a particular tag should possess in relation to the other tags in the tag cloud 506.

In another implementation, the "My Tags" section may include a tag cloud that displays all tags that are associated with the authorized user. Any tag, created by the authorized user, may be displayed in tag cloud 506 of the "My Tags" section. These tags include both public tags, which have been created by the authorized user, and private tags, which have been created by the authorized user.

Figure 6:
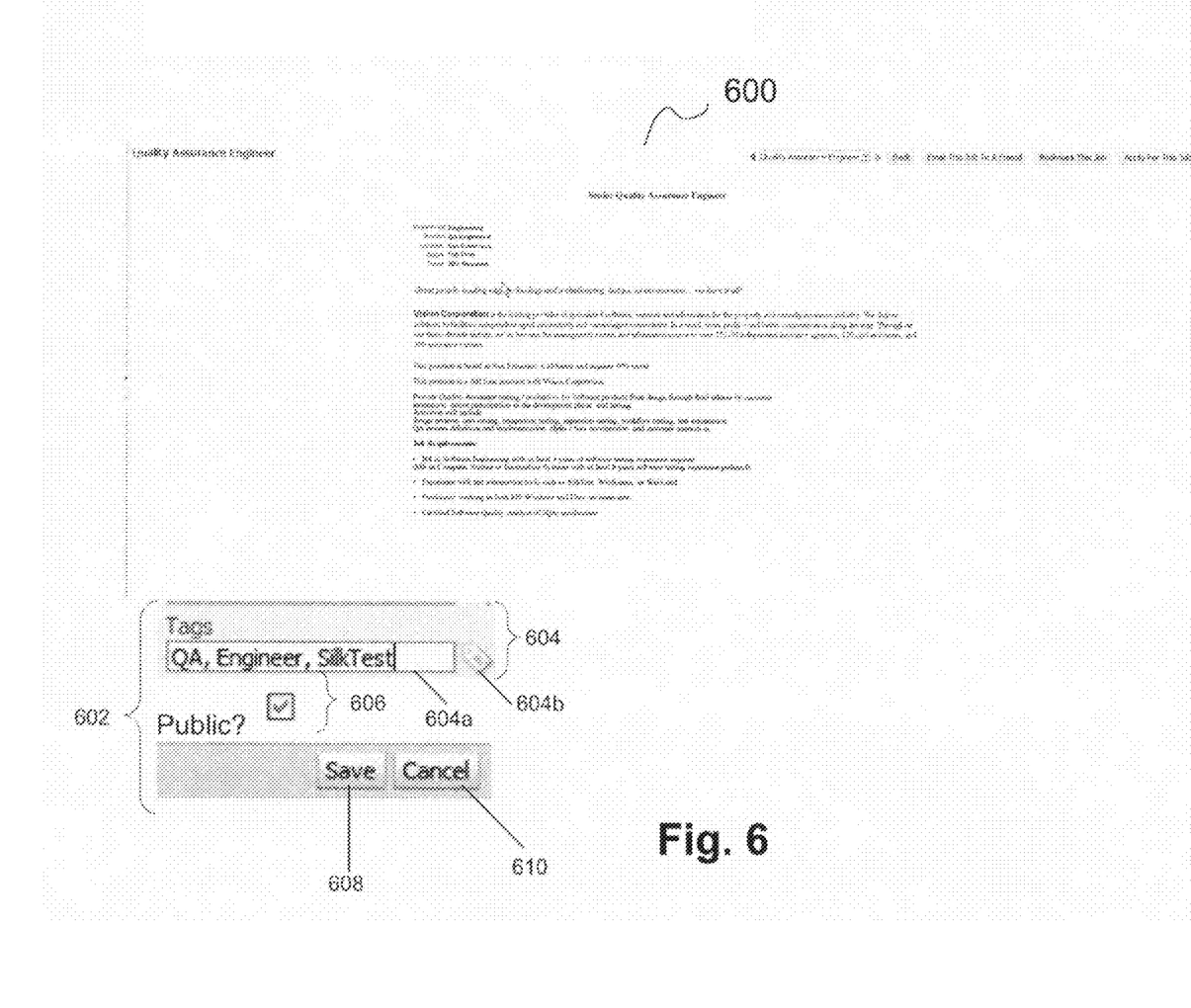
FIG. 6 is an illustration of a user interface for a registered user to create tags in accordance with one embodiment.

FIG. 6 illustrates a user interface that allows a registered user to create tags in accordance with one embodiment. User interface 600 displays a resource (e.g., a job requisition) that has been retrieved and/or selected by an authorized user while he/she is logged into his/her account 502. When a user has been authenticated via user authentication service 410, the user may create tags when he/she has selected a resource.

A tag creation tool 602 may be displayed in association with a selected resource, as shown in user interface 600. Tag creation tool 602 is substantially similar to tag creation tool 220 of FIG. 2. Similar to tag creation tool 220, tag creation tool 602 includes a tag creation field 604a and a tag submission icon 604b.

In addition, tag creation tool 602 may include a number of options that allow an authorized user to select any number of attributes for a tag. For example, as shown in FIG. 6, tag creation tool 602 may provide an authorized user with the option of selecting a "public" attribute 604 for any tags, which are entered into tag creation field 604a. If attribute 606 is selected, then the corresponding tags in tag creation field 604a will possess attribute 606 when the tags are submitted.

FIG. 6 illustrates an implementation in which an attribute may be selected by a radio button. If checkbox 606 has a corresponding checkmark when the tag submission icon is activated, then any tags that have been entered into tag creation field 604a will possess a public attribute. If checkbox 606 does not have a corresponding checkmark, then any tags that have been entered into tag creation field 604a will not possess a public attribute. Instead, these tags with a non-public attribute will contain a "private" attribute, associated with a particular authorized user.

Attributes, which are associated with a tag, may be used when determining which tags should be displayed for a particular tag cloud. In other words, the attributes allow certain tags to be selected for a tag cloud, or filtered out of a tag cloud. For example, a tag with a public attribute may be displayed in a public tag cloud, which is accessible to anyone (e.g., registered user or non-registered user) accessing the site, whereas a tag with a private attribute may be displayed only in a private tag cloud ("My Tags" section) associated with the authorized user that created the tag.

As another example, each tag may include a significance attribute that indicates a level of relevance of the tag in relation to the resource. The level of relevance may be specified by a number of levels. For example, the attribute may include three levels: a low level, a medium level, and a high level. If the tag has a significance attribute indicating a low level of relevance, then the weighted value is increased by a small value. If the tag has a significance attribute indicating a medium level of relevance, then the weighted value is increased by an mid-value. If the tag has a significance attribute indicating a high level of relevance, then the weighted value is increased by a high value.

In one embodiment, the significance attribute may be specified by the end user when creating a tag. The significance attribute may be manually specified by the end user via tag creation tool. Additionally or alternatively, the significance attribute may be automatically performed by tag cloud module 44. In one implementation, tag cloud module 44 may assign a significance attribute and/or a weighted value to the tag depending on a number of factors, such as the skill requirements for the job requisition and the job posting details, or based on a search for the description text and the resulting frequency of the keyword.

A number of attributes may be associated with a tag to further define it, or to contribute to its display features within a tag cloud. The attributes that may correspond to a particular tag may be selected based on a number of criteria, such as the users of the system, the nature of the tags, the nature of the tag cloud displays, a combination thereof, or other criteria.

Figure 7:
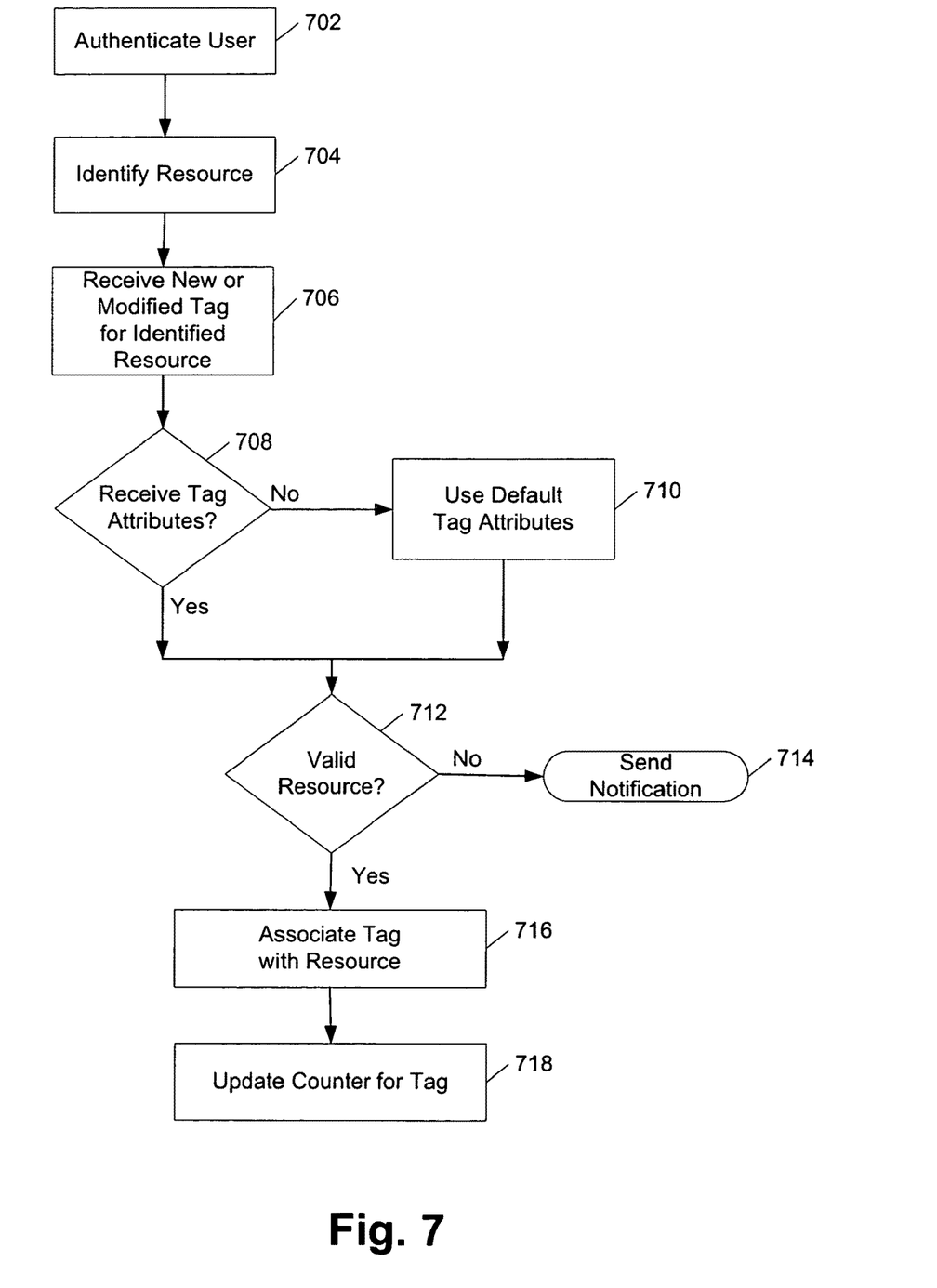
FIG. 7 is a flow diagram associated with creating tags for tag clouds in accordance with one embodiment.

FIG. 7 is a flow diagram illustrating a process associated with creating a tag for a tag cloud in accordance with one embodiment. In one embodiment, the functionality of the flow diagram of FIG. 7, and FIGS. 8-9 below, is implemented by software stored in memory or other computer readable or tangible media, and executed by a processor. In other embodiments, the functionality can be performed by hardware (e.g., through the use of an application specific integrated circuit ("ASIC"), a programmable gate array ("PGA"), a field programmable gate array ("FGPA"), etc.), or any combination of hardware and software.

At 702, a user is authenticated. A user may be authenticated, for example, by entering a username and password, which may be validated by an authentication service. In general, an authenticated user is a user that is registered with the site or system, and is authorized to access a number of resources associated with the site or system. For example, an authenticated user may include a hiring manager, a recruiter, and/or a job candidate.

At 704, a resource is identified. A resource may be identified in a variety of ways, as provided by the user interfaces associated with the application program. For example, in the implementations shown in FIGS. 4-6, a resource may be identified when a jobseeker selects a tag within a tag cloud. Additionally or alternatively, a resource may be identified when a jobseeker retrieves a resource (e.g., a job requisition) by other mechanisms provided by the application program. In the implementations shown in FIGS. 2-3, a resource may be identified by a hiring manager and/or recruiter once he/she has created a job posting and/or has selected a job posting.

In one implementation, the resources are stored in database system 30. Each resource may be identified by a unique (or primary) key that identifies a business object that is associated with the job requisition. For example, the unique key may be a "RESOURCE_ID." Each requisition may then be identified with an internal key that is generated by the database (and may not be exposed to users) to identify the requisition with respect to the object. For example, the internal key may be a "REQUISITION_ID."

At 706, a new or modified tag for an identified resource is received. A new tag is received when an authorized user submits a tag entry. A tag may be created and submitted with tag creation tool 220, tag center 320, or tag creation tool 602. A tag may be modified in any manner when an authorized user (e.g., a hiring manager and/or recruiter) submits a modification via tag center 320.

In one implementation, database system 30 may include internal keys to categorize tags that are being created on different business objects. This internal key may be a "SERVICE_ID." Database system 30 may include an identifier (e.g., "NAME"), which will be displayed as the resource name. This identifier (e.g., NAME) will be visible to the end user when he/she receives results from a tagged item.

At 708, the functionality determines if attributes associated with the tag have been received. Attributes, associated with a tag entry, may be inputted by an authorized user. For example, as illustrated in FIG. 6, a user may create tags (e.g., a "QA" tag, an "Engineer" tag, and a "SilkTest" tag) that have a public attribute, as shown at 608. In the alternative, as shown in FIG. 2, a user may create tags (e.g., an "Engineer" tag, a "QA" tag, and a "Spanish" tag) and may not specify any attributes for the tags to be created.

At 710, the functionality uses a default attribute for every attribute associated with the tag that is not specified by the user. For example, the public attribute may be selected as the default attribute for tags, which do not have any specific attributes assigned to it by the user.

At 712, the functionality evaluates whether the resource is valid. A resource is valid if it meets certain criteria. For example, if the resource is a job requisition, then the job requisition is deemed valid if the job requisition exists, if the advertised job is open and available for candidates, and if the job requisition has been posted and is accessible. Other resources may be deemed valid in association with criteria that best suits that resource. At a minimum, a resource is deemed valid if it is able to be retrieved when requested.

At 714, upon determining that the resource is not valid, the functionality indicates that the received tag is not valid. In addition, if desired, a notification may be sent to the application program to indicate to the user that the tag will not be shown in a tag cloud unless it is determined that the corresponding resource is valid.

At 716, upon determining that the resource is valid, the functionality associates the tag with the valid resource.

At 718, a counter associated with the tag is updated. The counter may be any type of means by which a unique tag may track or account for its weighted value. A weighted value may be used to determine the amount a particular tag should be emphasized, for example, with respect to other tags to be displayed in a tag cloud. For example, the number of times that a unique tag is referenced with respect to a set of resources may contribute to the weighted value. Additionally or alternatively, the number of times that a unique tag is referenced by a set of users may contribute to the weighted value. In general, the weighted value contributes to the manner in which a tag is displayed. For example, a tag with a greater weighted value will be shown more prominently (e.g., size, font, color, and/or boldness) than a tag with a lower weighted value. This feature allows tags to indicate characteristics of a set of resources. For example, at a glance, tag cloud display 402 indicates that there are, for example, a greater number of job requisitions that relate to a "Quality Engineer" tag than to an "Aircraft Systems" tag.

Figure 8:
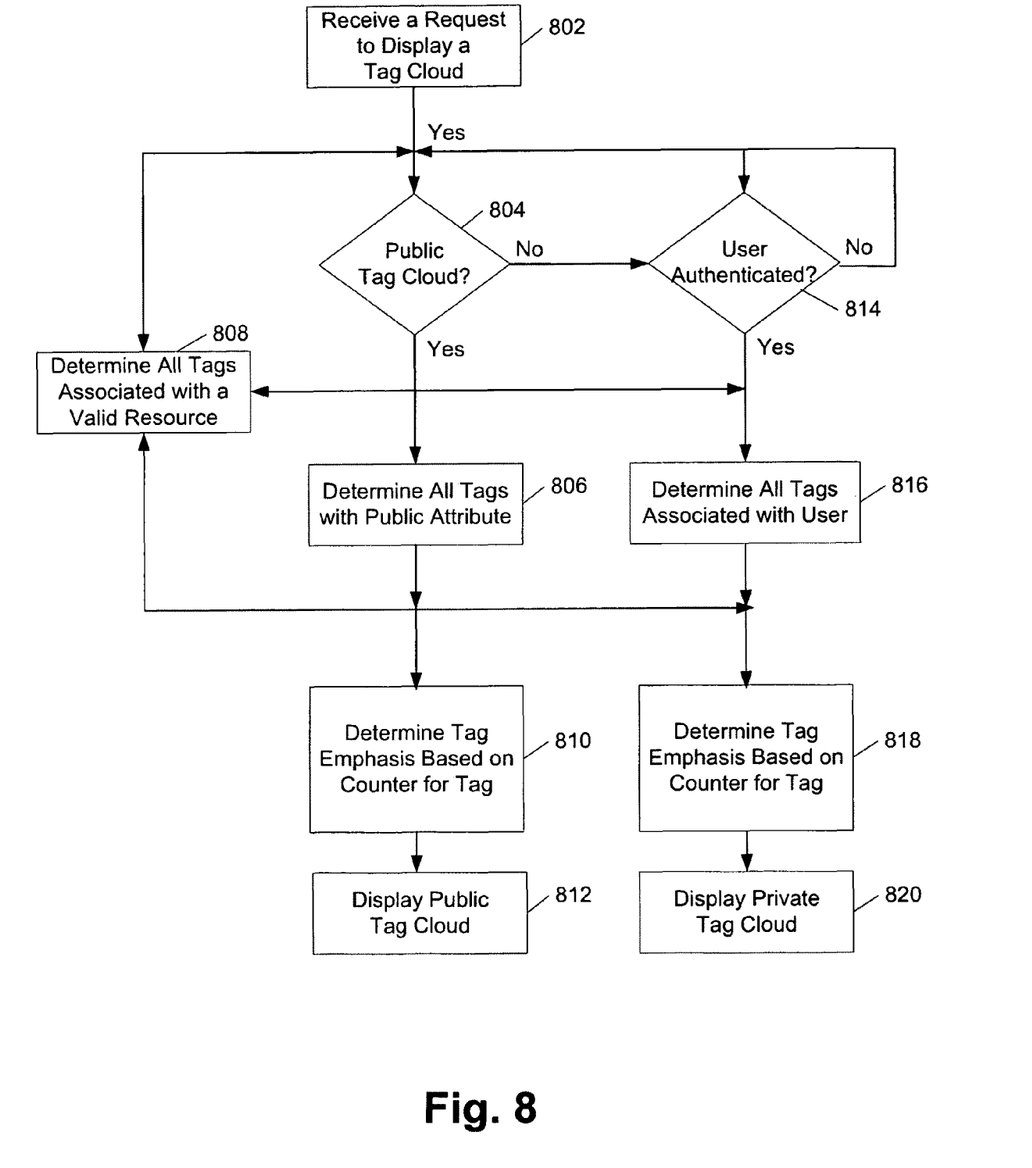
FIG. 8 is a flow diagram associated with determining a set of tags to be displayed for a particular tag cloud display in accordance with one embodiment.

FIG. 8 is a flow diagram associated with determining a set of tags to be displayed for a particular tag cloud display in accordance with one embodiment.

At 802, a request to display a tag cloud is received. The request may be made when a tag cloud is to be displayed. For example, in FIG. 4, a request to display tag cloud 402 is invoked by the application program when user interface 400 is accessed and displayed. In FIG. 5, a request to display tag cloud 505 is invoked by the application program when the user (e.g., "Albert Katz") is authenticated, and user interface 500 is accessed.

At 804, it is determined if a public tag cloud is to be displayed. A public tag cloud includes all tags that have public attributes for a set of resources. If it is determined that a public tag cloud is to be displayed, then the process proceeds to 806. If it is determined that a public tag cloud will not be displayed, then the process proceeds to 814.

At 806, once it has been determined that a public tag cloud will be displayed, then the functionality locates all tags that have a public attribute while verifying that the tags belong to a resource that is accessible to the users.

At 808, the functionality determines all tags from the set of tags determined at 806 that are associated with a valid resource. For example, in one embodiment, a job requisition may be deemed valid if the job requisition is active and published on the site, and the job itself has not been closed or filled.

For a tag to be displayed in a tag cloud, the tag must be associated with at least one valid resource. If a tag is not associated with at least one valid resource, then that tag is disassociated or filtered out of the tags, which will be displayed in the selected tag cloud.

As shown in FIG. 8, the functionality may perform step 808 at any point in time before performing step 810. For example, the functionality may perform step 808 prior to performing step 806. In the event that a set of tags have been filtered (e.g., 806 or 816) prior to step 808, then step 808 only considers the filtered result set when further filtering out tags based on valid resources. For example, if a public tag cloud is to be displayed and the functionality has located all tags with a public attribute, then the functionality will determine all tags that are associated with a valid resource from the set of tags that have public attributes.

At 810, for each tag identified as meeting the criteria of 806 and 808, the functionality determines a tag emphasis based on a weighted value (e.g., counter) associated with the tag.

At 812, a public tag cloud is displayed based at least on the determinations made at 804, 806, 808, and 810. Each tag in the public tag cloud contains a public attribute. In addition, each tag in the public tag cloud is associated with a valid resource, and is emphasized in accordance with its weighted value, as represented by the counter.

At 814, upon determining that a public tag cloud will not be displayed, the functionality determines if the user is authenticated. If the user is not authenticated, then the process proceeds to 804 and/or returns to 814.

At 816, the functionality determines that a private tag cloud will be displayed, and determines all tags that are associated with the authenticated user. Since a private tag cloud is a tag cloud that comprises tags that have been specified by a particular user, the functionality searches for all tags that are associated with the user.

At 820, for each tag identified as meeting the criteria of 816 and 818, the functionality determines a tag emphasis based on a counter associated with the tag.

At 822, a private tag cloud is displayed based at least on the determinations made at 804, 814, 816, and 808. Each tag in the private tag cloud corresponds with the authenticated user of 814. In addition, each tag in the private tag cloud is associated with a valid resource, and is emphasized in accordance with its weighted value, as represented by the counter.

Figure 9:
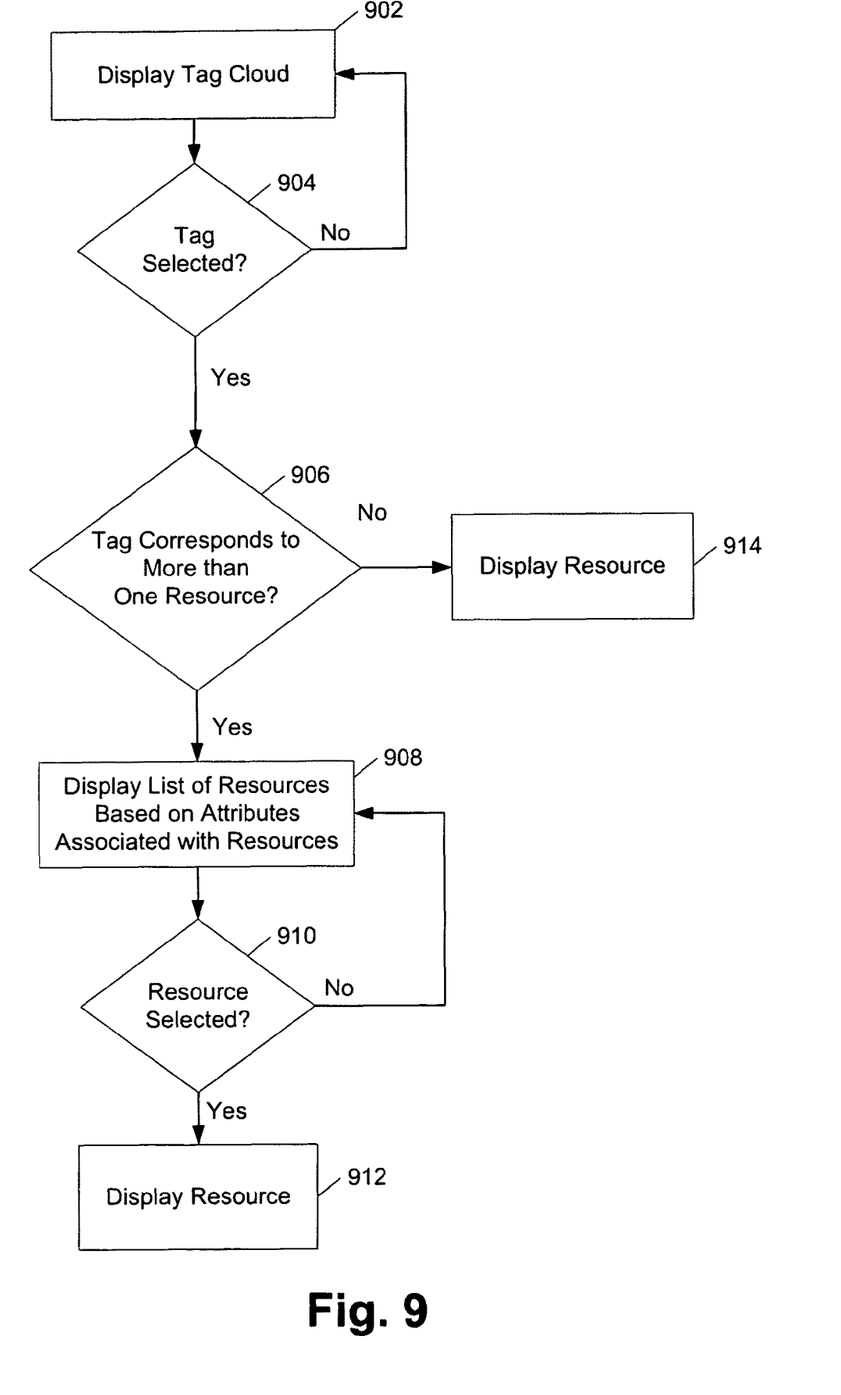
FIG. 9 is a flow diagram associated with a tag cloud display when a tag is selected in accordance with one embodiment.

FIG. 9 is a flow diagram associated with a tag cloud display when a tag is selected in accordance with one embodiment.

At 902, a tag cloud is displayed. The tag cloud at 902 may be a public tag cloud or a private tag cloud.

At 904, the functionality determines if a tag has been selected from the tag cloud, displayed at 902. If a tag has not been selected, then the process proceeds to 902. If a tag has been selected at 904, then the process proceeds to 906.

At 906, it is determined if the selected tag of 904 is associated with more than one resource. If it is determined that the tag corresponds to a single resource, then the process proceeds to 914. If it is determined that the tag corresponds to more than one resource, then the process proceeds to 908.

At 908, a list of resources, corresponding to the selected tag, is displayed. The list may include a number of relevant information associated with the resource such that a user may further sort through the list of resources with greater precision than that provided by the tag. The resources may be shown with their names, brief description, location, etc. Each resource may include a hyperlink that provides direct access to the resource itself. The order in which the resources, associated with the tag, are displayed may be based at least on the attributes of the tag. For example, resources, which have a significance attribute indicating a high level of relevance to the tag, may be displayed before other resources.

At 910, it is determined if a resource is selected. If a resource is selected, then the process continues to display the list of resources at 908. However, if a resource is selected, then the process proceeds to 912.

At 912, the resource, which was selected at 910, is displayed. The resource, as described above, may be anything that is identified by a tag. In a job requisition application program, a job requisition serves as a resource and is thus displayed.

One embodiment relates to creating tags with attributes, and displaying these tags in tag clouds in association with their attributes. For example, a tag may include a public attribute or a private attribute. Tags having a public attribute are displayed in a public tag cloud. These tags are accessible when a site that displays a public tag cloud is accessed. Tags having a private attribute, on the other hand, are associated with a particular user. A private tag cloud displays private tags when a user is authenticated and the private tag cloud is invoked.

These features allow a user searching for a particular resource to be able to search for a particular item of information based on tags. The user does not need to formulate search terms to input into the system for his initial search. Instead, the user may select tags that describe a resource that meet his search objectives. This feature does not require the user to formulate an input to serve as the basis of the search. Instead, the user may select tags, which will serve as the basis of the search. Accordingly, system performance is enhanced by avoiding costly searches in which the user is responsible for formulating input, which may or may not be recognized by the system.

At a glance, a user may be able to ascertain the type of results that he/she may receive before selecting a particular tag within a tag cloud because each tag indicates its characteristics (e.g., frequency and/or importance) with respect to a set of resources. For example, a tag that is associated with the greatest number of resources may be displayed more prominently (e.g., size, boldness, color, and/or font style) than other tags in the tag display. This prominence feature provides the user with an indication of the type of results that a user may expect to receive when selecting a tag.

When a resource is located and/or selected, an authorized user is enabled to create his/her own personalized tags to associate with the resource. This allows a user to create a meaningful association between a tag and a resource, which assists the user in categorizing, sorting, tracking, and/or relocating a particular resource or set of resources at a later time.

The system for creating tags allows tag creators to associate certain attributes for the tags. These attributes allow for tag creators to exert greater control over how the tags will be displayed, as well as who will have access to them.

The system for creating tags for tag cloud displays, as disclosed herein, provides authenticated users, associated with different roles, to be able to contribute to the tag creation process. For example, a hiring manager may create public tags for a job requisition. Meanwhile, a jobseeker may also create public tags for the same resource (i.e., the job requisition). The hiring manager may edit or modify public tags, which have been created by jobseekers, to ensure that all tags, which are associated with the job requisition, are appropriate. By providing multiple users with the ability to create tags and contribute to a public tag cloud display, the system is able to provide resources that may be located from any number of search and word-association perspectives. These feature may allow users, with diverse search perspectives to be able to identify and locate a resource based upon a number of different tag selections.

Furthermore, tag cloud module 44 includes a resource validation feature. This feature ensures that tags are associated with at least one valid resource. If a tag is not associated with at least one valid resource, then the tag is disassociated with the resource and is not shown in a tag cloud. Therefore, tag cloud module 44 returns valid results to the user. Consequently, an authorized user does not have to waste time selecting a job requisition that may return an error message because the job requisition may have been filled, closed, or deleted from the system.

As disclosed herein, tag cloud module 44 benefits a number of applications, such as a job recruitment application program. Tag cloud module 44 allows the resource owner (e.g., the hiring manager/recruiter responsible for the job requisition) with the ability to decide what words, phrases, images, and/or audio files should serve as tags for his/her resource. This feature puts more control into the hands of the hiring manager/recruiter. Furthermore, the hiring manager/recruiter may change the tags associated with the requisition at any time. If the hiring manager/recruiter is not getting enough candidates or not getting the right pool of candidates, the hiring manager/recruiter may decide to add more tags and/or modify the existing tags. The resource owner (e.g., hiring manager) is not bound to any search terms. Thus, a hiring manager/recruiter may change the tags when changes to a job requisition are being made.

An example of one embodiment may be illustrated by the following scenario. A recruiter logs onto a system. The recruiter creates a job requisition for a Quality Assurance Engineer position. This position requires certain skills, such as familiarity with a testing tool called "Testware." In addition, this position is bonus eligible. When the recruiter saves the job requisition, the recruiter is prompted to select words that best describe the job requisition. The recruiter wants to attract the right candidate so he decides to use the words, "Quality Assurance," "Testware," and "Bonus," as tags to catch a candidate's eye. As discussed, this system puts the control in the recruiter's hands to market the position as the recruiter sees fit.

In addition to allowing the recruiter or hiring manager to tag job requisitions, the system also allows candidates, who have been authenticated, to tag job requisitions that they find on a job application recruitment program, such as a company's career site. The tags could be either public tags that can be viewed by any candidate looking at the company's career site or they could be private tags so that only the candidate can see their own tags once they have logged into the company's career site. Allowing a candidate to tag job requisitions provides a quick way for the candidate to find the job requisition, again. In addition, this feature may help other candidates find job requisitions tagged with words that interest them as well. The company is provided with the option of allowing or denying certain users and/or candidates with the ability to create tags, or with the ability to create tags with certain attributes.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer readable medium having instructions stored thereon that, when executed by a processor, cause the processor to:

identify a job requisition that has been selected by a user within a set of job requisitions;

receive a request from the user to display a tag cloud, the tag cloud displaying a plurality of tags differently in accordance with a weighted value of each tag;

determine whether to display a public tag cloud or a private tag cloud;

display the public tag cloud that displays one or more tags with a public attribute when it is determined to display the public tag cloud;

display the private tag cloud that displays one or more tags with a private attribute and associated with the user when it is determined to display the private tag cloud and the user is authenticated;

permit the user to add a new tag or modify or delete the tag displayed in the tag cloud to create a tag for the selected job requisition, wherein the created tag comprises a descriptor that summarizes a subject matter and general content of the selected job requisition;
permit the user to specify attributes for the created tag, wherein each attribute contributes to a display of the created tag within the tag cloud, the attributes comprising the private attribute and the public attribute;
associate the created tag with the selected job requisition; and
update the weighted value of the created tag, wherein the weighted value contributes to differentiating the display of the created tag within the tag cloud;
wherein the public tag cloud is accessible to the authenticated user and non-authenticated users;
further causing the processor to determine if the authenticated user is responsible for managing the selected job requisition, wherein if the authenticated user is not responsible for managing the selected job requisition, then the authenticated user is only authorized to modify tags that have been created by the authenticated user; and if the authenticated user is responsible for managing the selected job requisition, then the authenticated user is authorized to modify (i) tags created by the authenticated user and (ii) tags with public attributes that have been created by other authenticated users.

2. The computer readable medium of claim 1, wherein the set of job requisitions are associated with an employment site that the authenticated user has permission to access.

3. The computer readable medium of claim 1, wherein the private tag cloud is accessible only to the authenticated user.

4. The computer readable medium of claim 1, wherein the updating of the weighted value includes:
determining if the tag includes a significance attribute that indicates a level of relevance of the tag in relation to the job requisition;
if the significance attribute indicates a low level of relevance, then adding a low value to the weighted value;
if the significance attribute indicates a medium level of relevance, then adding a middle value to the weighted value;
if the significance attribute indicates a high level of relevance, then adding a high value to the weighted value; and
if the tag does not have a significance attribute, then assigning a significance attribute indicating a low level of relevance and adding a low value to the weighted value.

5. The computer readable medium of claim 1, wherein the instructions further cause the processor to:
upon receiving the tag, determine if the selected job requisition is valid;
if the selected job requisition is not valid, provide an indication that the selected job requisition is not valid; and
if the selected job requisition is valid, associate the tag with the selected job requisition and update the weighted value of the tag.

6. A method of creating a tag for a job requisition, comprising:
selecting a job requisition from a set of job requisitions stored in a data storage;
receiving a request to display a tag cloud from a user, the tag cloud displaying a plurality of tags differently in accordance with a weighted value of each tag;
determining whether to display a public tag cloud or a private tag cloud;
displaying, using a display, the public tag cloud that displays one or more tags with a public attribute when it is determined to display the public tag cloud;
displaying, using the display, the private tag cloud that displays one or more tags with a private attribute and associated with the user when it is determined to display the private tag cloud and the user is authenticated;
adding a new tag to or modify or delete the tag displayed in the tag cloud to create a tag for the selected job requisition, wherein the created tag comprises a descriptor that summarizes a subject matter and general content of the selected job requisition;
specifying attributes for the created tag, wherein each attribute contributes to a display of the created tag within the tag cloud displayed on the display, the attributes comprising the private attribute and the public attribute;
associating the created tag with the selected job requisition;
updating, using a computing device, the weighted value of the created tag; and
differentiating, using the computing device, the display of the created tag within the tag cloud based on the weighted value of the created tag;
determining if the authenticated user is responsible for managing the selected job requisition;
if the authenticated user is not responsible for managing the selected job requisition, authorizing the authenticated user only to modify tags that have been created by the authenticated user; and
if the authenticated user is responsible for managing the selected job requisition, authorizing the authenticated user to modify (i) tags created by the authenticated user and (ii) tags with public attributes that have been created by another authenticated user.

7. The method of claim 6, wherein the associating the tag with the selected job requisition comprises:
determining if the selected job requisition is valid;
if the selected job requisition is not valid, providing an indication that the selected job requisition is not valid; and
if the selected job requisition is valid, associating the tag with the selected job requisition and update the weighted value of the tag.

8. The method of claim 6, further comprising authenticating, using the computing device, the user that is permitted to access the set of job requisitions.

9. The method of claim 8, wherein
the private tag cloud is accessible only to the authenticated user, and
the public tag cloud is accessible to the authenticated user and a non-authenticated user.

10. The method of claim 6, wherein the updating of the weighted value includes:
determining if the tag includes a significance attribute that indicates a level of relevance of the tag in relation to the job requisition; and
if the significance attribute indicates a low level of relevance, then adding a low value to the weighted value;
if the significance attribute indicates a medium level of relevance, then adding a middle value to the weighted value;
if the significance attribute indicates a high level of relevance, then adding a high value to the weighted value; and
if the tag does not have a significance attribute, then assigning a significance attribute indicating a low level of relevance and adding a low value to the weighted value.

11. A system for creating a tag for a job requisition, comprising:
- a data storage configured to store a plurality of job requisitions;
- a computing device coupled to the data storage and configured to identify a job requisition that has been selected by a user within the plurality of job requisitions stored in the data storage and
- to determine whether to display a public tag cloud or a private tag cloud in response to a request to display a tag cloud from the user; and
- a user interface device coupled to the computing device and configured to display the public tag cloud that displays one or more tags with a public attribute when the computing device determines to display the public tag cloud, and to display the private tag cloud that displays one or more tags with a private attribute when the computing device determines to display the private tag cloud and the user is authenticated, the user interface device further configured for the user to add a new tag to or modify or delete the tag displayed in the tag cloud to create a tag for the selected job requisition and to specify attributes for the created tag, the attributes comprising the public attribute and the private attribute, wherein the created tag comprises a descriptor that summarizes a subject matter and general content of the selected job requisition,
- wherein the computing device is further configured to associate the created tag with the selected job requisition, to update the weighted value of the created tag, and to differentiate a display of the created tag within the tag cloud based on the weighted value of the created tag;
- wherein the computing device is further configured to determine if the authenticated user is responsible for managing the selected job requisition;
- if the authenticated user is not responsible for managing the selected job requisition, authorize the authenticated user only to modify tags that have been created by the authenticated user; and
- if the authenticated user is responsible for managing the selected job requisition, authorize the authenticated user to modify (i) tags created by the authenticated user and (ii) tags with public attributes that have been created by another authenticated user.

12. The system of claim 11, wherein the computing device is further configured to:
- determine if the selected job requisition is valid;
- if the selected job requisition is not valid, provide an indication that the selected job requisition is not valid; and
- if the selected job requisition is valid, associate the tag with the selected job requisition and update the weighted value of the tag.

13. The system of claim 11, wherein the computing device is further configured to authenticate the user that is permitted to access the set of job requisitions stored in the data storage.

14. The system of claim 13, wherein
- the private tag cloud is accessible only to the authenticated user, and
- the public tag cloud is accessible to the authenticated user and a non-authenticated user.

15. The system of claim 11, wherein the computing device is further configured to:
- determine if the tag includes a significance attribute that indicates a level of relevance of the tag in relation to the job requisition;
- if the significance attribute indicates a low level of relevance, add a low value to the weighted value;
- if the significance attribute indicates a medium level of relevance, add a middle value to the weighted value;
- if the significance attribute indicates a high level of relevance, add a high value to the weighted value; and
- if the tag does not have a significance attribute, assign a significance attribute indicating a low level of relevance and adding a low value to the weighted value.

* * * * *

UNITED STATES PATENT AND TRADEMARK OFFICE
CERTIFICATE OF CORRECTION

PATENT NO. : 8,224,851 B2  
APPLICATION NO. : 12/510517  
DATED : July 17, 2012  
INVENTOR(S) : Banda et al.

Page 1 of 1

It is certified that error appears in the above-identified patent and that said Letters Patent is hereby corrected as shown below:

On Title page, in column 1, under "Inventors", line 4, delete "Pradesh" and insert -- Andhra Pradesh --, therefor.

On Title page, in column 1, under "Inventors", line 5, delete "Schereville," and insert -- Schererville, --, therefor.

On Title page, in column 1, under "Primary Examiner", line 1, delete "Hahn" and insert -- Hanh --, therefor.

In column 7, line 64, delete "("FGPA")," and insert -- ("FPGA"), --, therefor.

In column 15, line 5-10, In Claim 11, delete "a computing device coupled to the data storage and configured to identify a job requisition that has been selected by a user within the plurality of job requisitions stored in the data storage and to determine whether to display a public tag cloud or a private tag cloud in response to a request to display a tag cloud from the user; and" and insert -- a computing device coupled to the data storage and configured to identify a job requisition that has been selected by a user within the plurality of job requisitions stored in the data storage and to determine whether to display a public tag cloud or a private tag cloud in response to a request to display a tag cloud from the user; and --, therefor.

Signed and Sealed this  
Twenty-fifth Day of September, 2012

David J. Kappos  
*Director of the United States Patent and Trademark Office*